(12) United States Patent
Hoelscher et al.

(10) Patent No.: US 10,878,299 B2
(45) Date of Patent: Dec. 29, 2020

(54) METHODS AND APPARATUS FOR TESTING MULTIPLE FIELDS FOR MACHINE VISION

(71) Applicant: Cognex Corporation, Natick, MA (US)

(72) Inventors: Andrew Hoelscher, Somerville, MA (US); Nathaniel Bogan, Natick, MA (US)

(73) Assignee: Cognex Corporation, Natick, MA (US)

( * ) Notice: Subject to any disclaimer, the term of this patent is extended or adjusted under 35 U.S.C. 154(b) by 181 days.

(21) Appl. No.: 16/129,170

(22) Filed: Sep. 12, 2018

(65) Prior Publication Data

US 2020/0082230 A1   Mar. 12, 2020

(51) Int. Cl.
  *G06K 9/68* (2006.01)
  *G06K 9/00* (2006.01)
  *G06T 7/73* (2017.01)

(52) U.S. Cl.
  CPC ....... *G06K 9/6857* (2013.01); *G06K 9/00214* (2013.01); *G06T 7/75* (2017.01)

(58) Field of Classification Search
  CPC .... G06K 9/00214; G06K 9/6857; G06T 7/75; G06T 2207/20081
  USPC ........................ 382/103, 154, 209
  See application file for complete search history.

(56) References Cited

U.S. PATENT DOCUMENTS

| 9,171,247 B1 | 10/2015 | Hoffman et al. |
| 2006/0165293 A1* | 7/2006 | Hamanaka ......... G06K 9/00228 382/209 |
| 2010/0166294 A1 | 7/2010 | Marrion et al. |
| 2011/0206237 A1* | 8/2011 | Saruta .................. G01B 11/00 382/103 |
| 2015/0293600 A1 | 10/2015 | Sears |

(Continued)

FOREIGN PATENT DOCUMENTS

| EP | 3 206 164 A1 | 8/2017 |
| WO | WO 2012/066769 A1 | 5/2012 |

OTHER PUBLICATIONS

Extended European Search Report dated Feb. 14, 2020 in connection with European Application No. 19196665.4.

(Continued)

*Primary Examiner* — Daniel G Mariam
(74) *Attorney, Agent, or Firm* — Wolf, Greenfield & Sacks, P.C.

(57) ABSTRACT

The techniques described herein relate to methods, apparatus, and computer readable media configured to test a pose of a three-dimensional model. A three-dimensional model is stored, the three dimensional model comprising a set of probes. Three-dimensional data of an object is received, the three-dimensional data comprising a set of data entries. The three-dimensional data is converted into a set of fields, comprising generating a first field comprising a first set of values, where each value of the first set of values is indicative of a first characteristic of an associated one or more data entries from the set of data entries, and generating a second field comprising a second set of values, where each second value of the second set of values is indicative of a second characteristic of an associated one or more data entries from the set of data entries, wherein the second characteristic is different than the first characteristic. A pose of the three-dimensional model is tested with the set of fields, comprising testing the set of probes to the set of fields, to determine a score for the pose.

18 Claims, 10 Drawing Sheets

(56) References Cited

U.S. PATENT DOCUMENTS

| | | |
|---|---|---|
| 2015/0324998 A1 | 11/2015 | Song et al. |
| 2016/0125637 A1 | 5/2016 | Hyllus et al. |
| 2017/0124761 A1 | 5/2017 | Michel et al. |
| 2017/0140537 A1 | 5/2017 | Jia et al. |
| 2017/0236263 A1 | 8/2017 | Bogan |
| 2017/0251538 A1 | 8/2017 | Green et al. |
| 2017/0278013 A1 | 9/2017 | Yu et al. |
| 2018/0130224 A1 | 5/2018 | Hoelscher et al. |
| 2019/0029757 A1 | 1/2019 | Roh et al. |
| 2019/0045317 A1 | 2/2019 | Badhwar et al. |
| 2020/0082209 A1 | 3/2020 | Liu et al. |
| 2020/0082566 A1 | 3/2020 | Bogan et al. |

OTHER PUBLICATIONS

Drost et al., Model globally, match locally: Efficient and robust 3D object recognition. 2010 IEEE Conference on Computer Vision and Pattern Recognition (CVPR). Jun. 1, 2010; p. 998-1005.

\* cited by examiner

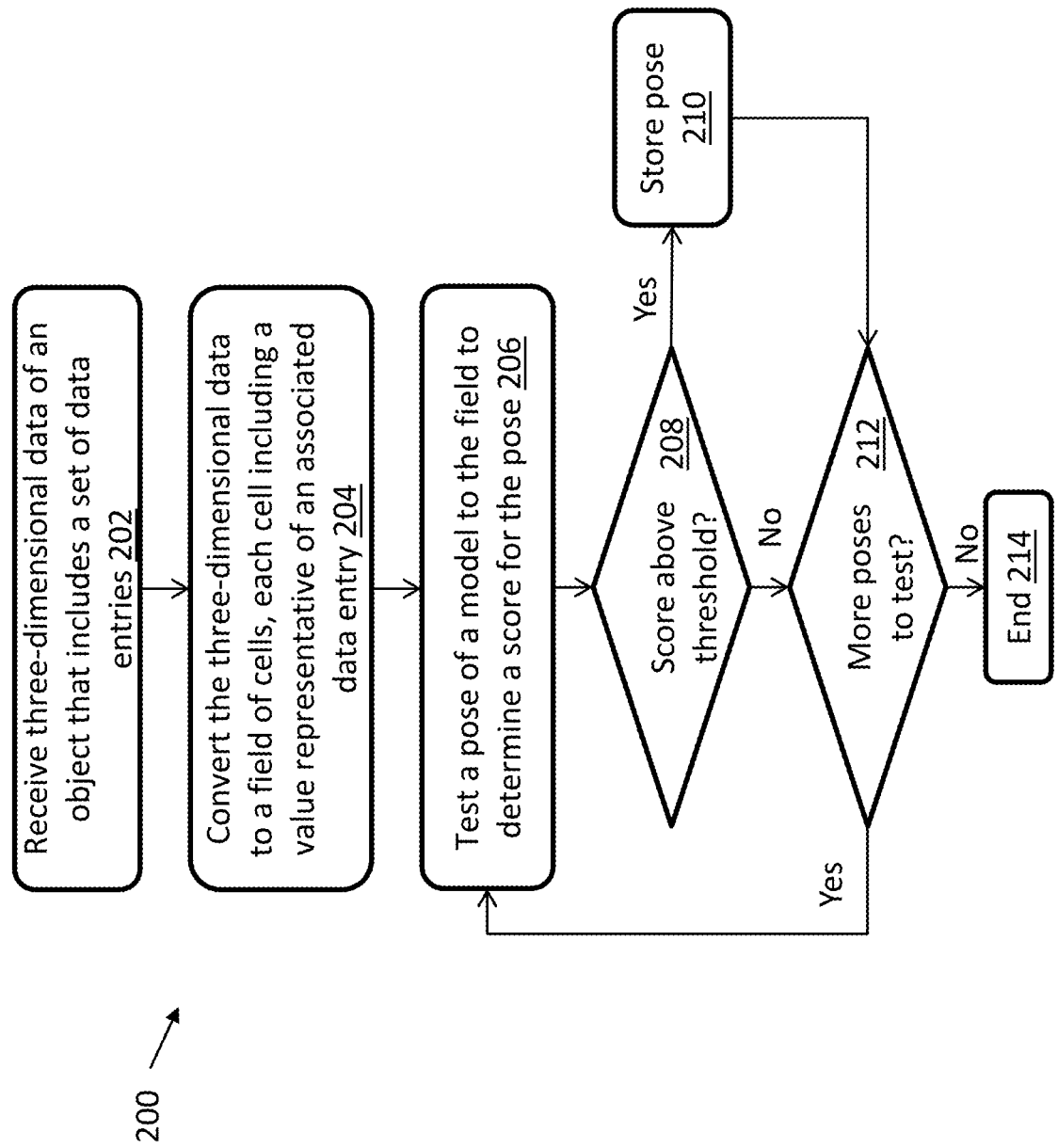

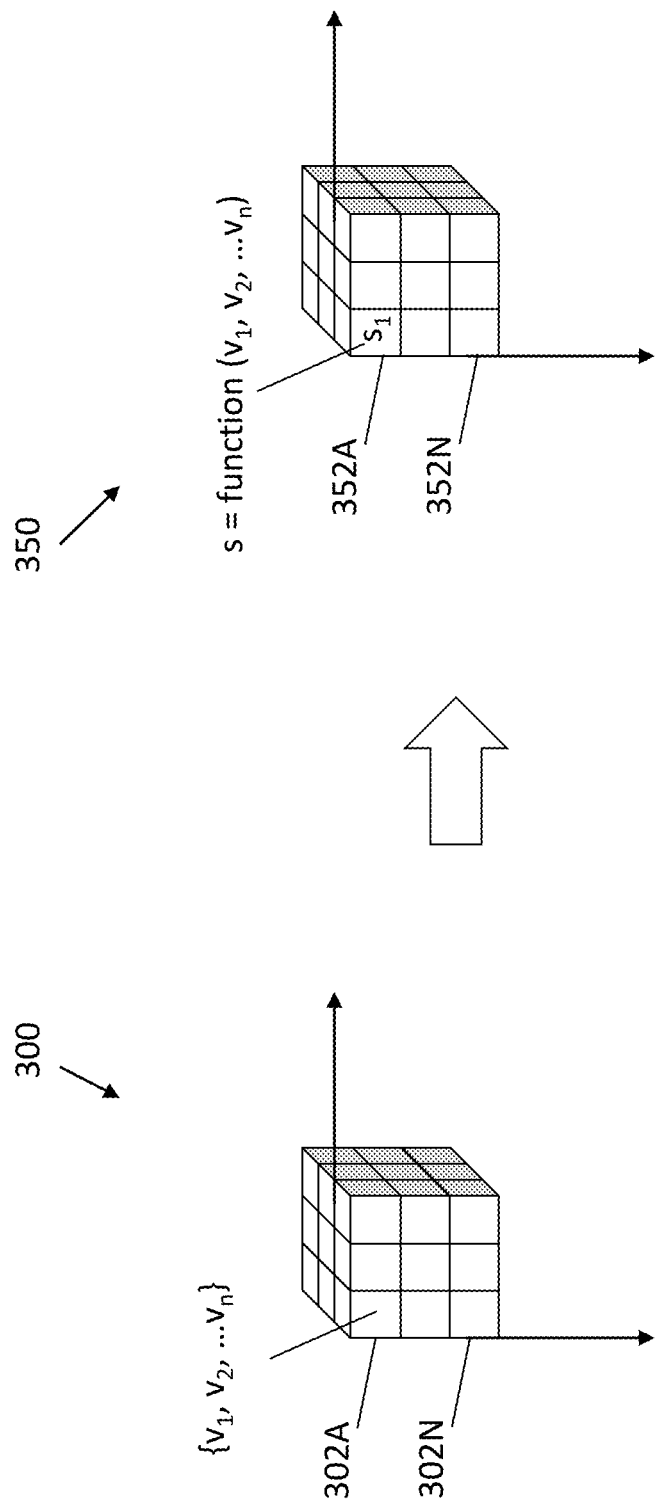

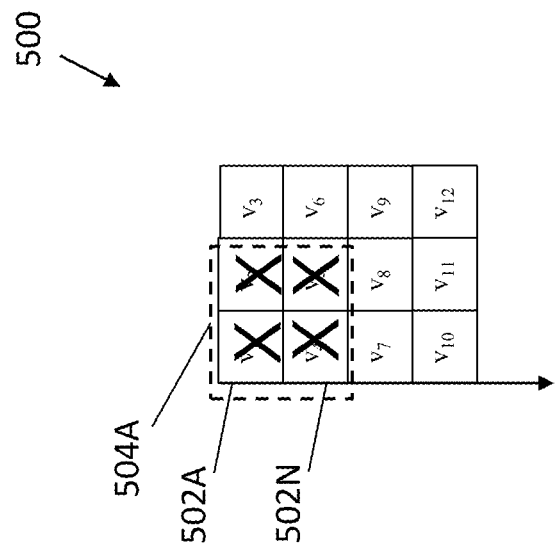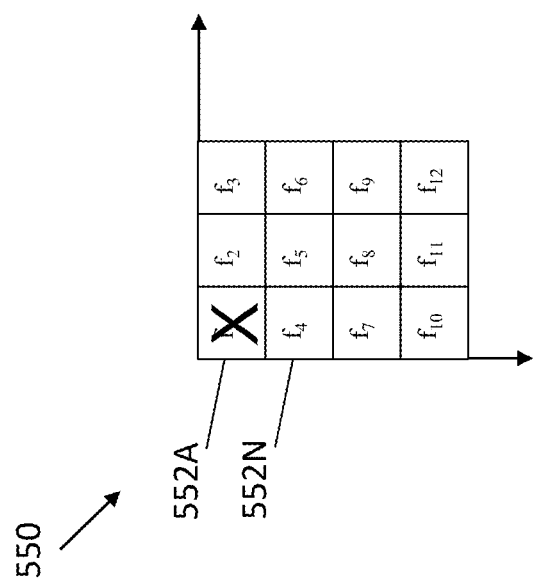
FIG. 6

METHODS AND APPARATUS FOR TESTING MULTIPLE FIELDS FOR MACHINE VISION

CROSS-REFERENCE TO RELATED APPLICATIONS

This application is related to U.S. patent application Ser. No. TBD, entitled "METHODS AND APPARATUS FOR GENERATING A DENSE FIELD OF THREE DIMENSIONAL DATA FOR MACHINE VISION," identified by the U.S. patent application Ser. No. TBD, entitled "METHODS AND APPARATUS FOR PROCESSING IMAGE DATA FOR MACHINE VISION," identified by filed on the even-date herewith, the entire content of which is herein incorporated by reference.

TECHNICAL FIELD

The techniques described herein relate generally to methods and apparatus for machine vision, including techniques for processing image data and for searching for a pattern in an image.

BACKGROUND OF INVENTION

One task often performed by machine vision systems is to attempt to search for and identify the location and orientation of a pattern of interest within images. Some techniques use a model to represent the pattern of interest, which can include a plurality of probes. Each probe is a point of interest and associated data (e.g., a location and a vector). Each probe can be used to determine, for example, the measure of the similarity of a run-time image feature or region to a pattern feature or region at a specific location. The plurality of probes can be applied at a plurality of poses to the run-time image, and the information from the probes at each pose can be used to determine the most likely poses of the pattern in the run-time image.

To speed up the pattern recognition process, some techniques use a multi-step approach to the pattern search process. For example, a first step can include a coarse search that attempts to locate one or more general regions in the image that may contain the pattern. A second step (and/or multiple additional steps) can be used to refine the search by searching each of the one or more general regions for the pattern. For instance, an algorithm may use a plurality of different models, where the system uses each model for a different associated resolution of the image. Thus, during the pattern recognition process, a coarse resolution and associated model may be used initially to identify a coarse approximated pose of an instance of a pattern in an image. Thereafter, a relatively finer resolution and associated model may be used to more precisely identify the pose of the pattern instance in the image. This iterative process continues until a finest resolution model is used and the precise pose of the pattern instance is identified.

SUMMARY OF INVENTION

In accordance with the disclosed subject matter, apparatus, systems, and methods are provided for improved machine vision techniques, and in particular for improved machine vision techniques that increase the speed and accuracy of searching for patterns in an image.

Some aspects relate to a computerized method for testing a pose of a model in three-dimensional data. The method includes receiving three-dimensional data of an object, the three-dimensional data comprising a set of data entries, converting the three-dimensional data to a field comprising a set of cells that each have an associated value, comprising determining, for each cell value, representative data based on one or more data entries from the set of data entries of the three-dimensional data, and testing a pose of the model with the field to determine a score for the pose.

In some examples, converting the three-dimensional data to a field includes generating a three-dimensional array of the set of values.

In some examples, converting the three-dimensional data to a field comprises generating a densely-populated lattice, wherein the densely-populated lattices comprises data for each cell of the lattice.

In some examples, the set of data entries of the three-dimensional data comprises a list of points, and determining, for each cell value, representative data based on one or more data entries comprises determining a vector based on one or more associated points in the list of points. Determining the vector for the one or more associated points can include determining, based on the list of points, the cell is associated with an interior portion of the object, and determining the vector comprises setting the vector to zero. Testing the pose of the model with field to determine the score can include testing a set of probes of the model to the field to determine the score, comprising summing a dot product of each probe and an associated vector in the field.

In some examples, converting the three-dimensional data to a field comprising a set of cells that each have an associated value, comprising determining, for each cell value, a representative vector, including generating an accumulated matrix comprising computing an outer product of each vector of a set of vectors with itself, wherein the set of vectors is determined data based the on one or more data entries from the set of data entries of the three-dimensional data, and extracting eigenvectors, eigenvalues, or both, from the accumulated matrix to determine the representative vector.

Some aspects relate to a system for testing a pose of a model in three-dimensional data. The system includes one or more processors configured to receive three-dimensional data of an object, the three-dimensional data comprising a set of data entries, convert the three-dimensional data to a field comprising a set of cells that each have an associated value, comprising determining, for each cell value, representative data based on one or more data entries from the set of data entries of the three-dimensional data, and test a pose of the model with the field to determine a score for the pose.

In some examples, converting the three-dimensional data to a field includes generating a three-dimensional array of the set of values.

In some examples, converting the three-dimensional data to a field includes generating a densely-populated lattice, wherein the densely-populated lattices comprises data for each cell of the lattice.

In some examples, the set of data entries of the three-dimensional data includes a list of points, and determining, for each cell value, representative data based on one or more data entries comprises determining a vector based on one or more associated points in the list of points. Determining the vector for the one or more associated points can include determining, based on the list of points, the cell is associated with an interior portion of the object, and determining the vector comprises setting the vector to zero. Testing the pose of the model with field to determine the score can include testing a set of probes of the model to the field to determine the score, comprising summing a dot product of each probe and an associated vector in the field.

In some examples, converting the three-dimensional data to a field comprising a set of cells that each have an associated value, comprising determining, for each cell value, a representative vector including generating an accumulated matrix comprising computing an outer product of each vector of a set of vectors with itself, wherein the set of vectors is determined data based the on one or more data entries from the set of data entries of the three-dimensional data, and extracting eigenvectors, eigenvalues, or both, from the accumulated matrix to determine the representative vector.

Some aspects relate to at least one non-transitory computer-readable storage medium storing processor-executable instructions that, when executed by at least one computer hardware processor, cause the at least one computer hardware processor to perform the acts of receiving three-dimensional data of an object, the three-dimensional data comprising a set of data entries, converting the three-dimensional data to a field comprising a set of cells that each have an associated value, comprising determining, for each cell value, representative data based on one or more data entries from the set of data entries of the three-dimensional data, and testing a pose of the model with the field to determine a score for the pose.

In some examples, converting the three-dimensional data to a field includes generating a three-dimensional array of the set of values.

In some examples, converting the three-dimensional data to a field includes generating a densely-populated lattice, wherein the densely-populated lattices comprises data for each cell of the lattice.

In some examples, the set of data entries of the three-dimensional data includes a list of points, and determining, for each cell value, representative data based on one or more data entries includes determining a vector based on one or more associated points in the list of points.

In some examples, determining the vector for the one or more associated points includes determining, based on the list of points, the cell is associated with an interior portion of the object, and determining the vector comprises setting the vector to zero.

In some examples, converting the three-dimensional data to a field comprising a set of cells that each have an associated value, comprising determining, for each cell value, a representative vector, including generating an accumulated matrix comprising computing an outer product of each vector of a set of vectors with itself, wherein the set of vectors is determined data based the on one or more data entries from the set of data entries of the three-dimensional data, and extracting eigenvectors, eigenvalues, or both, from the accumulated matrix to determine the representative vector.

Some aspects relate to a computerized method for testing a pose of a model to image data. The method includes receiving image data of an object, the image data comprising a set of data entries. The method includes determining a set of regions of the image data, wherein each region in the set of regions comprises an associated set of neighboring data entries in the set of data entries. The method includes generating processed image data, wherein the processed image data includes a set of cells that each have an associated value, and generating the processed image data includes, for each region in the set of regions, determining a maximum possible score of each data entry in the associated set of neighboring data entries from the image data. The method includes setting one or more values of the set of values based on the determined maximum possible score. The method includes testing the pose of the model using the processed image data.

In some examples, receiving image data includes receiving 2D image data, wherein each data entry comprises a 2D vector, and determining the maximum possible score for each processed image data value of the set of values includes determining a scalar value based on the 2D vectors in the region associated with the value.

In some examples, testing the pose of the model using the processed data includes determining the pose does not score above a predetermined threshold, comprising testing a plurality of probes of the model to associated scalar values of the processed data, and eliminating a set of poses associated with each of the regions used to determine the associated scalar values from further testing.

In some examples, receiving image data includes receiving 3D image data, wherein each data entry comprises a 3D vector, and determining the maximum possible score for each processed image data value of the set of values includes determining a scalar value based on the 3D vectors in the region associated with the value. Testing the pose of the model using the processed data can include determining the pose does not score above a predetermined threshold, comprising testing a plurality of probes of the model to associated scalar values of the processed data, and eliminating a set of poses associated with each of the regions used to determine the associated scalar values from further testing.

In some examples, the method includes converting the three-dimensional data to a second field comprising a second set of cells that are each associated with a second value, comprising determining, for each second cell value, representative data based on one or more data entries from the set of data entries of the three-dimensional data, and testing a pose of the model with the second field based on the testing of the pose of the model with the field.

Some aspects relate to a system for testing a pose of a model to image data, the system comprising one or more processors configured to receive image data of an object, the image data comprising a set of data entries. The one or more processors are configured to determine a set of regions of the image data, wherein each region in the set of regions comprises an associated set of neighboring data entries in the set of data entries. The one or more processors are configured to generate processed image data, wherein the processed image data includes a set of cells that each have an associated value, and generating the processed image data includes, for each region in the set of regions, determining a maximum possible score of each data entry in the associated set of neighboring data entries from the image data. The one or more processors are configured to set one or more values of the set of values based on the determined maximum possible score. The one or more processors are configured to test the pose of the model using the processed image data.

In some examples, receiving image data includes receiving 2D image data, wherein each data entry comprises a 2D vector, and determining the maximum possible score for each processed image data value of the set of values comprises determining a scalar value based on the 2D vectors in the region associated with the value. Testing the pose of the model using the processed data can include determining the pose does not score above a predetermined threshold, including testing a plurality of probes of the model to associated scalar values of the processed data, and eliminating a set of poses associated with each of the regions used to determine the associated scalar values from further testing.

In some examples, receiving image data includes receiving 3D image data, wherein each data entry comprises a 3D vector, and determining the maximum possible score for each processed image data value of the set of values comprises determining a scalar value based on the 3D vectors in the region associated with the value. Testing the pose of the model using the processed data can include determining the pose does not score above a predetermined threshold, comprising testing a plurality of probes of the model to associated scalar values of the processed data, and eliminating a set of poses associated with each of the regions used to determine the associated scalar values from further testing.

In some examples, the one or more processors are further configured to convert the three-dimensional data to a second field comprising a second set of cells that are each associated with a second value, comprising determining, for each second cell value, representative data based on one or more data entries from the set of data entries of the three-dimensional data, and test a pose of the model with the second field based on the testing of the pose of the model with the field.

Some aspects relate to at least one non-transitory computer-readable storage medium storing processor-executable instructions that, when executed by at least one computer hardware processor, cause the at least one computer hardware processor to perform the acts of receiving image data of an object, the image data comprising a set of data entries. The instructions cause the at least one computer hardware processor to determine a set of regions of the image data, wherein each region in the set of regions comprises an associated set of neighboring data entries in the set of data entries. The instructions cause the at least one computer hardware processor to generate processed image data, wherein the processed image data includes a set of cells that each have an associated value, and generating the processed image data includes, for each region in the set of regions, determining a maximum possible score of each data entry in the associated set of neighboring data entries from the image data. The instructions cause the at least one computer hardware processor to set one or more values of the set of values based on the determined maximum possible score. The instructions cause the at least one computer hardware processor to test the pose of the model using the processed image data.

In some examples, the instructions cause the at least one computer hardware processor to perform the acts of receiving image data includes receiving 2D image data, wherein each data entry comprises a 2D vector, and determining the maximum possible score for each processed image data value of the set of values comprises determining a scalar value based on the 2D vectors in the region associated with the value. Testing the pose of the model using the processed data includes determining the pose does not score above a predetermined threshold, comprising testing a plurality of probes of the model to associated scalar values of the processed data, and eliminating a set of poses associated with each of the regions used to determine the associated scalar values from further testing.

In some examples, receiving image data includes receiving 3D image data, wherein each data entry comprises a 3D vector, and determining the maximum possible score for each processed image data value of the set of values includes determining a scalar value based on the 3D vectors in the region associated with the value.

In some examples, testing the pose of the model using the processed data includes determining the pose does not score above a predetermined threshold, comprising testing a plurality of probes of the model to associated scalar values of the processed data, and eliminating a set of poses associated with each of the regions used to determine the associated scalar values from further testing.

In some examples, the instructions cause the at least one computer hardware processor to perform the acts of converting the three-dimensional data to a second field comprising a second set of cells that are each associated with a second value, comprising determining, for each second cell value, representative data based on one or more data entries from the set of data entries of the three-dimensional data, and testing a pose of the model with the second field based on the testing of the pose of the model with the field.

Some aspects relate to a computerized method for testing a pose of a three-dimensional model. The method includes storing a three-dimensional model, the three dimensional model comprising a set of probes, receiving three-dimensional data of an object, the three-dimensional data comprising a set of data entries, converting the three-dimensional data into a set of fields, including generating a first field comprising a first set of values, where each value of the first set of values is indicative of a first characteristic of an associated one or more data entries from the set of data entries, and generating a second field comprising a second set of values, where each second value of the second set of values is indicative of a second characteristic of an associated one or more data entries from the set of data entries, wherein the second characteristic is different than the first characteristic, and testing a pose of the three-dimensional model with the set of fields, comprising testing the set of probes to the set of fields, to determine a score for the pose.

In some examples, generating the first field and second field includes generating a three-dimensional array for each field, wherein each three dimensional array comprises a set of three indexes, comprising an index for each dimension, and each three-dimensional array implies the x, y, and z location of each of the associated first and second values by the set of three indexes.

In some examples, the probes, the first set of values of the first field, and the second set of values of the second field comprise surface normal data, edge boundary data, intensity data, or some combination thereof.

In some examples, testing the pose to determine the score for the pose comprises summing a dot product for each probe and associated value.

In some examples, the method includes testing a plurality of poses to determine a plurality of associated scores, determining which poses of the plurality of poses comprises a score above a predetermined threshold to generate a set of poses, and storing, for subsequent processing, the set of poses. Each pose in the set of poses can represent a local peak of the associated scores, the method further including refining the set of poses to determine a top pose of the model.

Some aspects relate to a system for determining parameters for image acquisition, the system comprising one or more processors configured to store a three-dimensional model, the three dimensional model comprising a set of probes, receive three-dimensional data of an object, the three-dimensional data comprising a set of data entries, convert the three-dimensional data into a set of fields, including generating a first field comprising a first set of values, where each value of the first set of values is indicative of a first characteristic of an associated one or more data entries from the set of data entries, and generating a second field comprising a second set of values, where each second value of the second set of values is indicative of a second characteristic of an associated one or more data entries from the set of data entries, wherein the second characteristic is different than the first characteristic, and test a pose of the three-dimensional model with the set of fields, comprising testing the set of probes to the set of fields, to determine a score for the pose.

In some examples, generating the first field and second field includes generating a three-dimensional array for each field, wherein each three dimensional array comprises a set of three indexes, comprising an index for each dimension, and each three-dimensional array implies the x, y, and z location of each of the associated first and second values by the set of three indexes.

In some examples, the probes, the first set of values of the first field, and the second set of values of the second field include surface normal data, edge boundary data, intensity data, or some combination thereof.

In some examples, testing the pose to determine the score for the pose comprises summing a dot product for each probe and associated value.

In some examples, the one or more processors are further configured to test a plurality of poses to determine a plurality of associated scores, determining which poses of the plurality of poses comprises a score above a predetermined threshold to generate a set of poses, and store, for subsequent processing, the set of poses.

In some examples, each pose in the set of poses represents a local peak of the associated scores, the method further comprising refining the set of poses to determine a top pose of the model.

Some embodiments relate to at least one non-transitory computer-readable storage medium storing processor-executable instructions that, when executed by at least one computer hardware processor, cause the at least one computer hardware processor to perform the acts of storing a three-dimensional model, the three dimensional model comprising a set of probes, receiving three-dimensional data of an object, the three-dimensional data comprising a set of data entries, converting the three-dimensional data into a set of fields, including generating a first field comprising a first set of values, where each value of the first set of values is indicative of a first characteristic of an associated one or more data entries from the set of data entries, and generating a second field comprising a second set of values, where each second value of the second set of values is indicative of a second characteristic of an associated one or more data entries from the set of data entries, wherein the second characteristic is different than the first characteristic, and testing a pose of the three-dimensional model with the set of fields, comprising testing the set of probes to the set of fields, to determine a score for the pose.

In some examples, generating the first field and second field comprises generating a three-dimensional array for each field, wherein each three dimensional array comprises a set of three indexes, comprising an index for each dimension, and each three-dimensional array implies the x, y, and z location of each of the associated first and second values by the set of three indexes.

In some examples, the probes, the first set of values of the first field, and the second set of values of the second field comprise surface normal data, edge boundary data, intensity data, or some combination thereof.

In some examples, testing the pose to determine the score for the pose comprises summing a dot product for each probe and associated value.

In some examples, the instructions further cause the one or more processors to test a plurality of poses to determine a plurality of associated scores, determine which poses of the plurality of poses comprises a score above a predetermined threshold to generate a set of poses, and storing, for subsequent processing, the set of poses.

In some examples, each pose in the set of poses represents a local peak of the associated scores, the instructions further causing the one or more processors to refine the set of poses to determine a top pose of the model.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 2A shows an exemplary method for generating a field and testing a model using the field, according to some embodiments.

FIG. 3 shows exemplary three-dimensional image data and an associated field, according to some embodiments.

FIG. 6 shows an exemplary elimination of a set of poses and associated data entries of the two-dimensional image data during a coarse search, according to some embodiments.

DETAILED DESCRIPTION OF INVENTION

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 1:
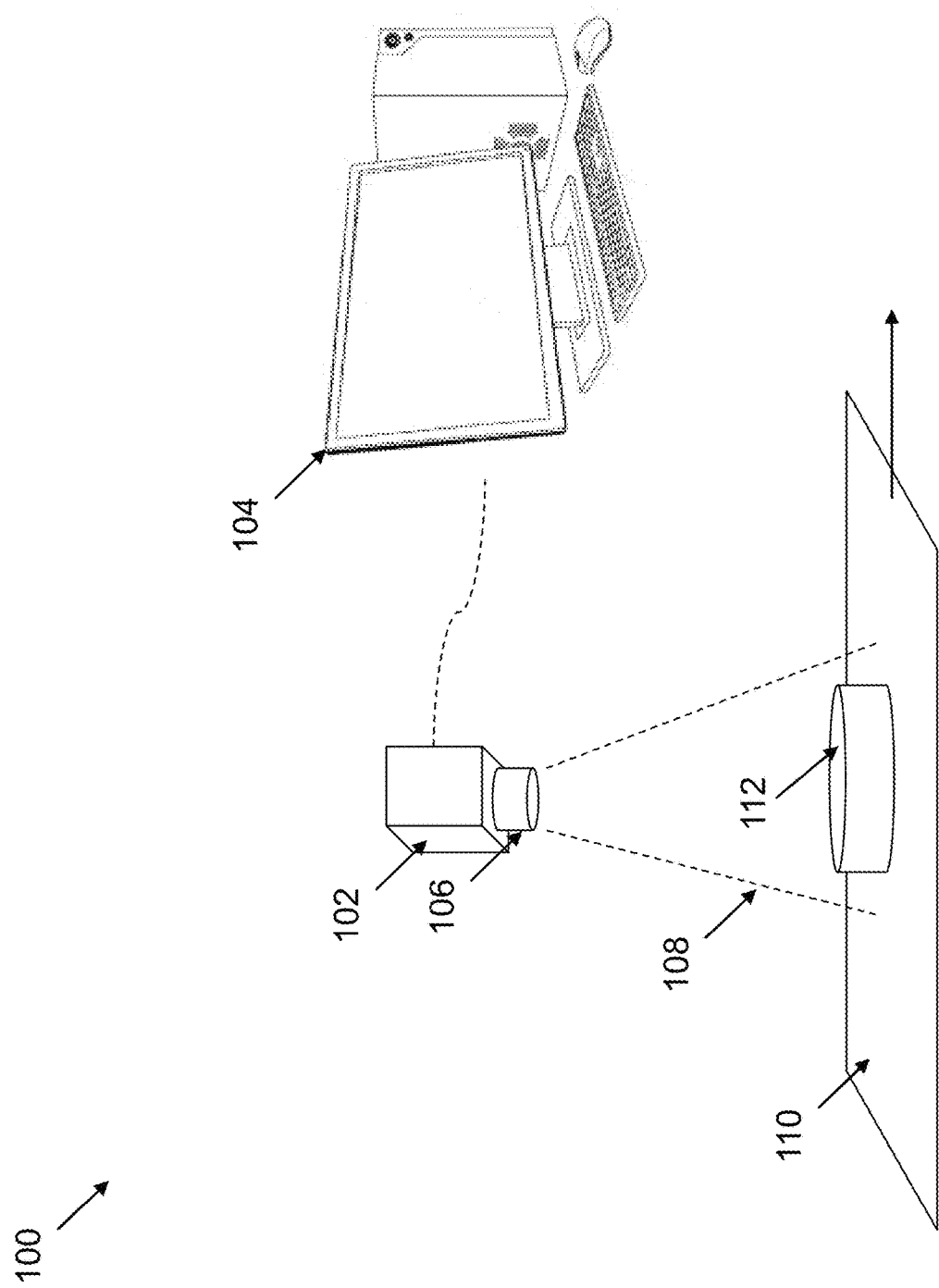
FIG. 1 shows an exemplary machine vision system, according to some embodiments.

FIG. 1 shows an exemplary machine vision system 100, according to some embodiments. The exemplary machine vision system 100 includes a camera 102 (or other imaging acquisition device) and a computer 104. The computer 104 includes one or more processors and a human-machine interface in the form of a computer display and optionally one or more input devices (e.g., a keyboard, a mouse, a track ball, etc.). Camera 102 includes, among other components, a lens 106 and a camera sensor element (not illustrated). The lens 106 includes a field of view 108, and the lens 106 focuses light from the field of view 108 onto the sensor element. The sensor element generates a digital image of the camera field of view 108 and provides that image to a processor that forms part of computer 104. As shown in the example of FIG. 1, object 112 travels along a conveyor 110 into the field of view 108 of the camera 102. The camera 102 can generate one or more digital images of the object 112 while it is in the field of view 108 for processing, as discussed further herein. In operation, the conveyor can contain a plurality of objects. These objects can pass, in turn, within the field of view 108 of the camera 102, such as during an inspection process. As such, the camera 102 can acquire at least one image of each observed object 112.

In some embodiments the camera 102 is a two-dimensional imaging device, such as a two-dimensional (2D) CCD or CMOS imaging array. In some embodiments, two-dimensional imaging devices generate a 2D array of brightness values. In some embodiments, a machine vision system processes the 2D data, such as by generating a two-dimensional gradient field image. The gradient field image can include, for example, a set of cells with associated magnitudes and directions. For example, the gradient field can include the Cartesian components of the vector (x, y), which can imply the magnitude and direction, the gradient field can store the actual (r, theta) values, and/or the like. In some embodiments, the camera 103 is a three-dimensional (3D) imaging device. The 3D imaging device can generate a set of (x, y, z) points (e.g, where the z axis adds a third dimension, such as a distance from the 3D imaging device). The 3D imaging device can use various 3D image generation techniques, such as shape-from-shading, stereo imaging, time of flight techniques, projector-based techniques, and/or other 3D generation technologies.

In some embodiments, the machine vision system processes the 3D data from the camera 103. The 3D data received from the camera 103 can include, for example, a point cloud and/or a range image. A point cloud can include a group of 3D points that are on or near the surface of a solid object. For example, the points may be presented in terms of their coordinates in a rectilinear or other coordinate system. In some embodiments, other information, such a mesh or grid structure indicating which points are neighbors on the object's surface, may optionally also be present. In some embodiments, information about surface features including curvatures, surface normal, edges, and/or color and albedo information, either derived from sensor measurements or computed previously, may be included in the input point clouds. In some embodiments, the 2D and/or 3D data may be obtained from a 2D and/or 3D sensor, from a CAD or other solid model, and/or by preprocessing range images, 2D images, and/or other images.

Examples of computer 104 can include, but are not limited to a single server computer, a series of server computers, a single personal computer, a series of personal computers, a mini computer, a mainframe computer, and/or a computing cloud. The various components of computer 104 can execute one or more operating systems, examples of which can include but are not limited to: Microsoft Windows Server™; Novell Netware™; Redhat Linux™, Unix, and/or a custom operating system, for example. The one or more processors of the computer 104 can be configured to process operations stored in memory connected to the one or more processors. The memory can include, but is not limited to, a hard disk drive; a flash drive, a tape drive; an optical drive; a RAID array; a random access memory (RAM); and a read-only memory (ROM).

As discussed herein, to search for a model in an image of an object, the techniques can be configured to perform two (or more) phases, including a first phase to determine an approximate or coarse location of the model in the image, and then a second phase to refine the coarse location to determine the specific location of the model. Using multiple phases can be beneficial, for example, because different phases can use different technical approaches to perform the search in order to improve search speed, efficiency, and/or the like. For 2D pattern searching approaches, for example, the techniques can include training a model of an object that includes a set of probes. Each of the 2D probes can include an (x, y) location and a direction. The machine vision system stores the trained model for use with a search of subsequently captured runtime images of a scene (e.g., the scene depicted in FIG. 1 of the object 112 moving along the conveyor belt 110). The machine vision system can capture an image of the scene, such as a 2D image with pixel values that represent the light accumulated at each cell. The machine vision system can convert the 2D image to a dense gradient field, where each cell includes a single gradient value reflecting a change in the data for the particular image (e.g., the gradient can be near zero for constant areas, and large near edges). The gradient values can be, for example, a vector, a scalar value (e.g., a magnitude or direction angle), and/or the like. For example, if each cell includes a vector, the vector may have magnitude of zero. The machine vision system can test different transformations of the 2D model (e.g., translation, rotation, scale, skew, aspect, perspective, etc.) to calculate a score for the particular placement. The score can reflect, for example, how well the probes match the vectors of the 2D image (e.g., where the vectors are the gradient of the input 2D information, as discussed further herein). For example, some techniques can test the model bin-by-bin, and take highest scoring locations for subsequent refinement. Some techniques can be configured to focus on local peaks, since nearby searches will be similar, and the system may be configured to try to avoid marking all nearby matches as candidate poses. In the 3D context, for example, the image can be a range image, a point cloud, and/or the like. As a general matter, and as discussed further herein, the machine vision system can train a 3D model of an object that includes a set of probes. The machine vision system can use the 3D model to search for the pose of the 3D model in runtime 3D images. As discussed herein, the machine vision system can process the 3D images to generate one or more 3D fields to facilitate searching for the pose of the 3D model. The field can include a set of vectors. The Cartesian components of the vectors (x, y, z) can be stored, which can imply the magnitude and direction, the field can store the actual the actual (r, lat, long) values, and/or the like.

Embodiments discussed herein may be used in a variety of different applications, some of which may include, but are not limited to, part-picking in vision guided robotics, three-dimensional inspection, automotive kitting, molded plastic and cast metal volume inspection, and assembly inspection. Such applications can include searching for and identifying the location and orientation of a pattern of interest within images (e.g., to guide a robot gripper, or to inspect objects). In some embodiments, a training step is used to develop a model to represent a pattern of interest, which can include a plurality of probes. Each probe is a point of interest and associated data (e.g., a location and a vector), and can be used to determine, for example, a measure of similarity of a run-time image feature or region to a pattern feature or region at a specific location. The plurality of probes can be applied at a plurality of poses to the run-time image, and the information from the probes at each pose can be used to determine the most likely poses of the pattern in the run-time image.

The inventors have discovered that existing machine vision techniques may suffer from significant inefficiencies when using traditional 3D data. In particular, the inventors have discovered that a significant amount of processing time is often consumed by searching for neighboring points of a point in 3D data (e.g., by searching for nearby points in a point cloud). For example, while machine vision systems can be efficient at processing contiguous data, machine vision systems can be far less efficient at searching for and randomly accessing data. In particular, computing devices often include optimized hardware for massive parallelization of tasks that are repeated on consecutive memory locations. Interrupting such parallelization with conditional branches can significantly reduce performance (e.g., since a branch typically requires stopping the parallel activity, consuming time to perform the branch/jump, and then spinning back up the parallel activity). The inventors have developed technological improvements to machine vision techniques to address these and other inefficiencies. As discussed further herein, the techniques include developing a dense field from 3D data, where the dense field includes data for each field value that is determined based on the 3D data. The inventors have discovered that because each value includes data, machine vision techniques can use the field values as part of the process to avoid searching for neighboring points as discussed above, which can significantly reduce the processing time of existing machine vision techniques. The techniques disclosed herein, by creating data at each entry of a field or lattice, and processing them consecutively, can avoid time consuming branches that interrupt parallelization, and can therefore significantly improve performance.

FIG. 2A shows an exemplary method 200 for generating a field from a 3D image for testing a 3D model, according to some embodiments. At step 202, the machine vision system receives three-dimensional data (e.g., a point cloud, a dense 3D image, etc.) of an object. The three-dimensional data includes a set of data entries, such as a range image (e.g., which has a height for each cell), a point cloud, and/or other information regarding the 3D data. At step 204, the machine vision system converts the three-dimensional data to a field. The field includes a set of values. The method includes determining, for each value of the field, representative data derived from the 3D data. The representative data can include, for example, a vector and/or other representative information for the data entries, such as just a vector magnitude and/or direction instead of a full vector, a matrix (e.g., $vv^T$ discussed further herein), and/or the like. The method can include determining the representative data based on one or more data entries from the set of data entries of the three-dimensional data. At step 206, the machine vision system tests a pose of the model with the field to determine a score for the pose. At step 208, the machine vision system determines whether the pose is acceptable, or whether the pose should be skipped (e.g., ignored, discarded, etc.). For example, the machine vision system can score the pose of the 3D model to the field and determine whether the score is above a threshold. As another example, as discussed further herein, the machine vision system can score the pose of the 3D model to multiple fields. If the score meets a threshold (e.g., is above the threshold), the method proceeds to step 210 and the machine vision system stores the pose (e.g., for subsequent refinement, as discussed herein). If the score does not meet the threshold, the method proceeds to step 212 and determines whether there are additional poses of the 3D model to test. If there are further poses, the method proceeds back to step 206 to test another pose of the 3D model. If there are no further poses, the method proceeds to step 214 and ends.

Referring to step 204, converting the three-dimensional data to the field can include generating a three-dimensional array of the set of values. For example, the three dimensions can represent the x, y and z axes of the 3D data. Each value in the set of values can be a vector. The vector can be represented in various ways. For example, in some embodiments, each vector can be stored as x, y and z components, where each component can be represented using a certain number of bits, such as signed 8 bit integers, where the values can range from −127 to 127. As another example, in some embodiments, each vector can be represented using a magnitude and two angles. In some embodiments, converting the three-dimensional data to a field can include generating a densely-populated lattice. A densely-populated lattice can include, for example, a value for each possible spot in the lattice. The spots in the lattice may or may not be connected to the original position of the data entries in the 3D data. For example, a kernel or filter can be used such that the lattice spots have a different grid than the 3D data. The process can include converting a point cloud to a dense field, with the dense field including a vector at each possible location of the dense field.

In some embodiments, the techniques can include applying a transform to the 3D data before generating the field. For example, the techniques can include applying a rigid transform, a linear transform, and/or a non-linear transform before generating the field. In some embodiments, the techniques can include applying one or more transforms to account for distortion. For example, a point cloud can be acquired with delay so that the values are skewed in one or more axes, and the point cloud can be converted to account for the skew. In some embodiments, the techniques can include searching for distortions of a model when searching for poses of a model. For example, the distortion degree of freedom can be searched by testing various transforms of the model.

Figure 2B:
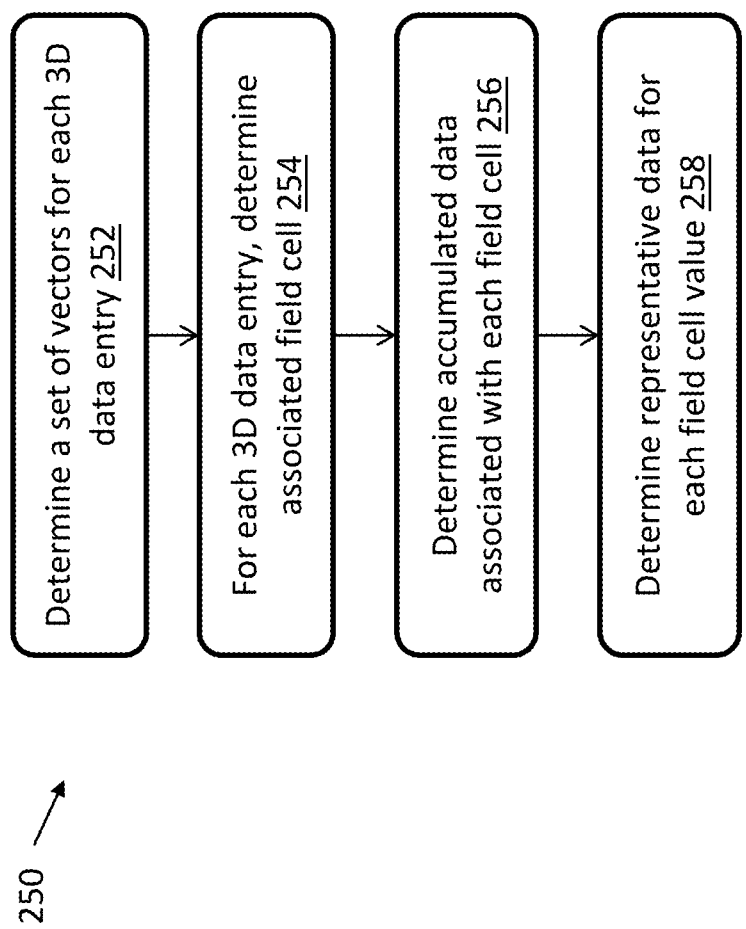
FIG. 2B shows an exemplary method for generating a field, according to some embodiments.

Referring further to step 204, FIG. 2B shows an exemplary method 250 for generating a field, according to some embodiments. For example, in some embodiments the techniques can be used to convert a 3D point cloud to a dense field. A dense field includes data at each field value, as discussed further herein (e.g., whereas a point cloud only lists where there are points, and a lack of points is implied by there not being any points near a location). As noted above, the data can include a vector. The field cell's (x, y, z) indicates where the vector occurs in the field. In some embodiments, the field values that lie inside a three-dimensional object in the 3D data can be set to zero. Therefore, in some implementations, the field can provide easier access to the information compared to the 3D data, such as compared to a point cloud. In some embodiments, the field can make the 3D data appear more uniform, whereas other 3D data, such as a point cloud, may highlight particular areas. As another example, in some embodiments the techniques can be used to convert a dense 3D image to a dense field. For example, the system could determine a gradient at each point for a dense 3D image and apply the method 250, as discussed further herein.

At step 252, the machine vision system determines a set of vectors for each 3D data entry (e.g., 3D point). For example, the machine vision system can use neighbor 3D data point locations and/or information from the 3D sensor to determine a surface normal vector and an edge vector for each 3D data entry. Any of the vectors may have a zero (0) length, such as to indicate that for a particular data entry there is not a clear normal or edge.

At step 254, for each 3D data entry (e.g., point), the machine vision system determines the field cell (e.g., voxel) that contains it. At step 256, the machine vision system determines accumulated data that is associated with each field cell. In some embodiments, the techniques include determining the input vectors that are associated with each field cell. In some embodiments, the system can accumulate summary information about the vectors associated with all of the 3D data points that land in that field cell. For example, the summary information can include the vector components themselves (such as when polarity is meaningful) and/or other information, such as the components of the matrix formed by an outer product of each vector with itself $vv^T$ (e.g., which can be used when polarity is not meaningful). In some embodiments, the techniques can include spreading the range of influence of each point, e.g., to blur or thicken features of the 3D data. In some embodiments, the system can make duplicates in a predetermined pattern around each 3D data point. The predetermined pattern may be, for example, relative to the direction of the vector. For example, the techniques can thicken a surface (e.g., by duplicating normal above and below), thicken an edge (e.g., by duplicating edges in a cylinder around a crease vector), and/or the like. The predetermined pattern may differ depending on what the vector represents, such as whether the vector represents a normal or edge.

At step 258, the machine visions system determines representative data for each field cell based on the accumulated data from step 256. In some embodiments, if a field cell is not associated with any accumulated data (e.g., is not associated with any 3D data entries, such as not having any vectors fall into the field cell), the field cell can be set to zero (e.g., where zero is used to refer to a zero vector, when the field includes vectors).

In some embodiments, the techniques can include determining a representative vector for each field cell based on the accumulated data for that cell determined in step 254. For example, the representative vector can be determined by calculating a component-wise average, by extracting Eigen vectors from the accumulated matrix (e.g., formed by accumulating an outer product of each vector with itself, $vv^T$), and/or the like. In some embodiments, a regularization constant can be added to the denominator, such as to prevent division by zero, to reduce the length of the representative vector when there is less data that contributed to it, and/or the like. For example, a matrix M can be computed for a set of n vectors v, which includes vectors $v_1$ through $v_n$ (while not shown in the equation for simplicity, the summations are over all vectors $v_i$ for i=1–n), with a regularization constant k using the following equation:

$$M = \frac{\sum vv^T}{\sum |v| + k}$$

In some embodiments, the machine vision system can store the matrix M when generating the field (e.g., for pose testing). In some embodiments, representative data of the matrix M can be stored, such as just the six unique values in the matrix, information representative of the six unique values (e.g., just five of the six values (or fewer), since a constant multiple of the identity matrix can be added to zero out one of the values), and/or the like.

In some embodiments, the machine vision system can determine a representative vector using matrix M. For example, the machine vision system can use Eigen decomposition to determine the representative vector, as noted above. The representative vector can be computed using eigenvalues, eigenvectors, and/or both. In some embodiments, the eigenvalues can be used to determine the magnitude of the representative vector. For example, the largest eigenvalue can be used as a representation of the maximum magnitude. As another example, one or more additional eigenvalues can be used in combination with the largest eigenvalue (e.g., in order to take into account potential disagreement of vectors in the representative vector). In some embodiments, the eigenvectors can be used to determine the direction of the representative vector. For example, the eigenvector associated with the largest eigenvalue can be used to represent the dominant direction. The eigenvalue(s) can be multiplied with the eigenvector(s) to determine the representative vector. For example, the eigenvector associated with the largest eigenvalue can be multiplied with just the largest eigenvalue, multiplied with the difference of the second-largest eigenvalue from the largest eigenvalue (e.g., which can be zero when the largest and second-largest eigenvalues have the same value), and/or the like. In some embodiments, the eigenvector(s) can be multiplied with the square root of the eigenvalue(s), e.g., in order to remove the squaring of the magnitude from $vv^T$. For example, the eigenvector associated with the largest eigenvalue can be multiplied with the square root of the largest eigenvalue, multiplied with the square root of the difference of the second-largest eigenvalue from the largest eigenvalue, and/or the like.

In some embodiments, the field can be normalized. For example, the system can normalize the field by mapping each vector's length (e.g. through a sigmoid), without altering the direction. Normalization can be used, for example, to adjust a pose score response relative to a threshold. For example, some embodiments can simply bin scoring results as either a pass (e.g., above the threshold) or fail (e.g., below the threshold). In some embodiments, it can be more stable to normalize the field (e.g., using a sigmoid to output a length between zero and one).

In some embodiments, the field is not normalized. For example, in some embodiments, the raw data (e.g., the magnitude of the vectors) can be meaningful without normalization. For example, a shorter vector magnitude can mean less confidence/agreement about a normal or edge, whereas a longer vector magnitude means a greater confidence. In some embodiments, the scoring techniques (e.g., a dot product, as discussed herein) can incorporate such data from the field (e.g., magnitudes), and therefore it can be desirable to use an un-normalized field.

In some embodiments, each field cell value can be based on one associated data entry in the 3D data, a plurality of data entries in the 3D data, and/or none of the data entries. In some embodiments, the techniques can include determining a vector for each of the field cell values. For example, the data entries of the three-dimensional data can include a list of points, and the techniques can determine, for each field cell, a vector based on the list of points. In some embodiments, as noted above, the techniques can determine a value for fields that are interior to an object in the 3D data. For example, the machine vision system can determine that the one or more field cells are associated with an interior portion of the object based on the point cloud, and set the value to zero.

Referring to steps 206 through 212, as noted above, the method 200 can be used to perform a coarse phase of a 3D model alignment search in the 3D image. In some embodiments, the method 200 can search for an approximate pose of the 3D model in the field that can be further refined by subsequent steps. The approximate pose can include, for example, a 3D position that includes the (x, y, z) location as well as orientation data, such as roll, pitch, and/or yaw. Referring to step 206, in some embodiments the testing includes testing a set of probes of the 3D model to the field. For example, the machine vision system can test a set of probes of the model to the field to determine the score by summing the dot product of each probe and an associated vector in the field. In some embodiments, as discussed further in conjunction with FIG. 9, the score can be based on multiple values (e.g., multiple fields), such as crease edge information, occlusion boundary information, color information, intensity information, and/or the like.

FIG. 3 shows exemplary three-dimensional image data 300 and an associated field 350, according to some embodiments. Field 350 can be generated using the method 250 in FIG. 2B. The 3D image data 300 includes a set of data entries 302A through 302N (collectively, data entries 302). For each data entry 302, the machine vision system can determine a set of vectors. For example, machine vision system can determine vectors $v_1$ through $v_n$ for data entry 302A, as shown in FIG. 3. The field 350 includes a set of cells with associated values 352A through 352N (collectively, cells 352). To convert the 3D image data 300 to a field 350, the machine vision system can execute one or more functions to convert the determined vectors to an associated field value. For example, as shown for value 352A, the machine vision system can execute a function that operates on the vectors $v_1$ through $v_n$ of data entry 302A to generate summary information "s" for data entry 302A. As discussed herein, the resulting value s for the function can be a single vector, a scalar value (e.g., a vector magnitude), and/or other summary information. The function can be executed on each data entry to populate associated values of the field. While FIG. 3 shows just a set of vectors $v_1$ through $v_n$ for data entry 302A, this is for exemplary purposes only to illustrate the techniques. As discussed herein, the techniques can include accumulating information about a plurality of data points that are used to determine the associated value for each field cell.

As discussed above, the summary information "s" can be converted into a final representative vector (not shown in FIG. 3). For example, in some embodiments, the summary information "s" can be converted into a final representative vector by computing a component-wise average that divides the summary information by the number of entries accumulated to that cell (e.g., optionally with a regularization constant in the denominator). As another example, in some embodiments, Eigen vectors can be extracted from a matrix used to accumulate information.

The inventors have determined that searching for a model in image data, whether it be 2D data or 3D data, can be a time intensive process because it can require iteratively testing each pose of the model to the data. When performing a search, for example, there is the dimensionality of the search space (e.g., the image data and/or field, such as 2D or 3D runtime data), as well as the dimensionality of the pose space (e.g., x, y, z, roll, pitch, yaw, scale, skew, aspect, perspective, and other non-linear distortion, etc.). The more the dimensions increase, the more poses to search for a model in image data, which increases the processing required to search for the model.

The inventors have developed techniques to process image data prior to searching for a model. The processed image data allows the system to eliminate large portions of the potential pose space during the search. Machine vision systems can be configured to perform a large spot inspection in the search space, and then refine those areas, to provide significant increases in processing speed. As discussed further below, the processed image data allows the machine vision system to take arbitrarily large steps in a manner that still ensures the machine vision system does not miss any pose(s) that would score well (e.g., above a predetermined threshold) as the poses are refined. For example, this technique contrasts with downsampling techniques, which can be used to improve the search speed but which may miss pose(s) that would otherwise be considered as the poses are refined. In some embodiments, the techniques discussed herein can also provide for sampling that is at the same dimension of the image data (e.g., the field), reducing a group of data entries of the image data to a single value. The set of values in the processed image data allow the machine vision system to test a pose to determine whether the model cannot possibly be found at any associated pose in the image data.

As discussed further herein, the techniques can generally divide the search into one or more layers. For example, the techniques can generate two different layers of image data, including a first layer of processed image data (e.g., layer 1), and a second layer of processed image data (e.g., layer 2) to create larger search regions of the image data, where each larger search region in the second layer cumulatively represents a number of smaller regions of the first layer. The system can process each larger region of a lower layer to determine if it will search the smaller regions in the higher layer(s) (e.g., where layer "1" is a higher layer to layer "2") for the pose. As discussed herein, the system can use a third layer and/or more layers, with each lower layer being generated using larger regions than preceding layers. In some embodiments, the larger regions can be analyzed using a maximum-score bound of associated smaller regions. The maximum-score technique can be used to allow the system to determine that the model will not score higher than the value in the regions. Therefore, the system can use the maximum-score technique to determine whether any possible poses in the associated regions in a higher layer will score high enough, such that those poses are worth further examination when testing the image data. Otherwise, the system can determine that the pose is not worth further consideration at any of the data entries associated with that region.

Figure 4:
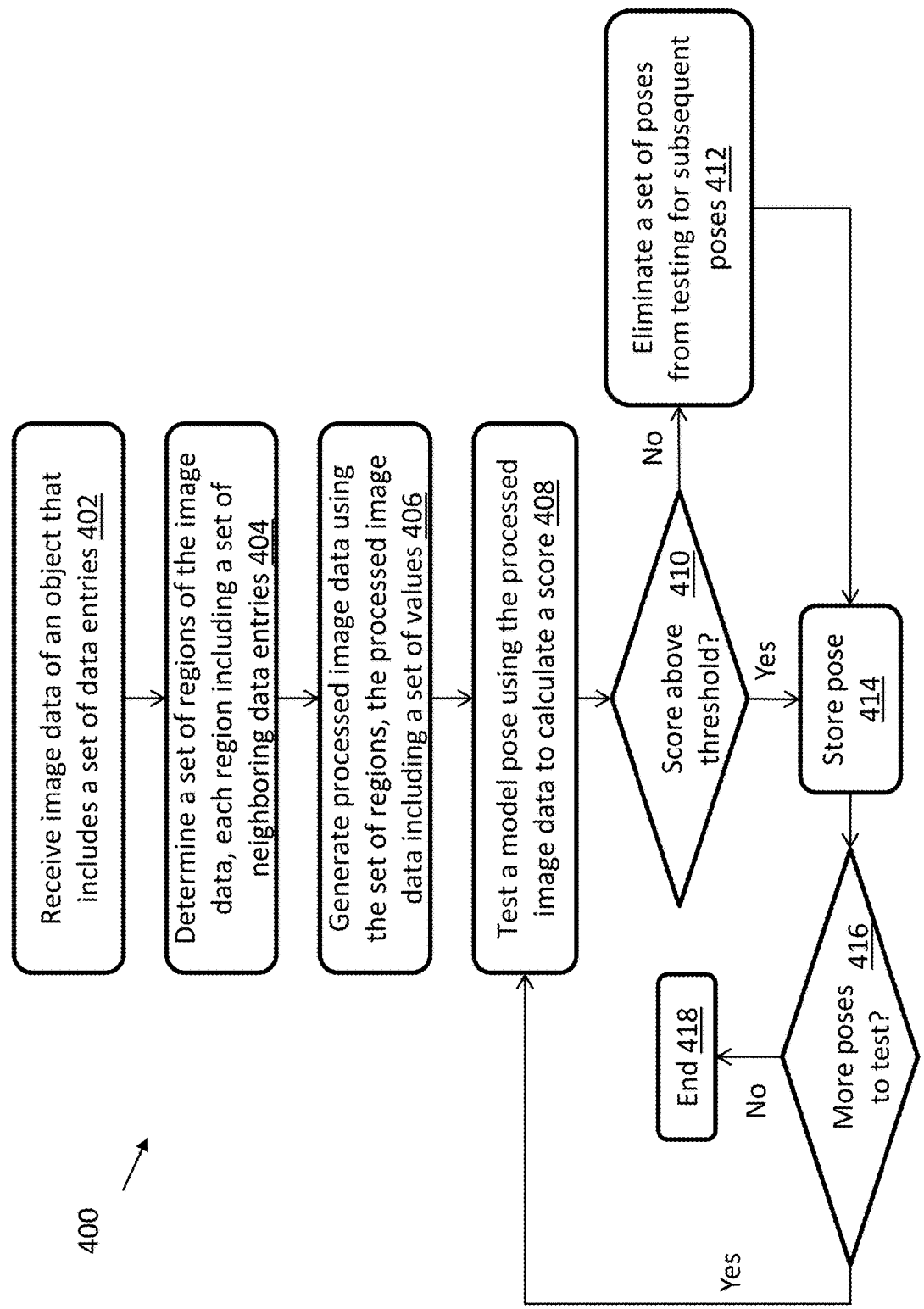
FIG. 4 shows an exemplary method for generating processed image data for a coarse search, according to some embodiments.

FIG. 4 shows an exemplary method 400 for a coarse search, according to some embodiments. At step 402, the machine vision system receives image data (e.g., 2D data or 3D data, such as a point cloud, a dense 3D image, etc.) of an object. The image data includes a set of data entries, which can include gradient information, vectors, and/or the like. At step 404, the system determines a set of regions of the image data. Each region includes an associated set of neighboring data entries from the image data. At step 406, the system generates processed image data using the set of regions. As discussed further herein, the processed image data includes a set of cells that each have an associated value. The system can generate the processed image data by, for each region, determining a maximum possible score of each data entry in the associated set of neighboring data entries from the image data. The system can set one or more of the processed image data values based on the determined maximum possible score. At step 408, the system tests a pose of the model using the processed image data to calculate a score for the pose. At step 410 the system determines whether the score meets a predetermined threshold. If the score does not meet the threshold, the method proceeds to step 412 and eliminates one or more regions from testing for subsequent poses. If the score meets the threshold, the method proceeds to step 414 and stores the pose (e.g., for subsequent refinement). At step 416, the system determines whether there are further poses to test, and if so, the method proceeds back to step 408, otherwise the method ends at step 418.

Referring to step 402, the image data can be a vector field representing any type of data. For example, the vector field can represent one or more of (a) surface normal vectors, (b) crease edge vectors (e.g., for actual edges of an object such as the sides of a book, and/or silhouette or occlusion edges, such as the edge of mug, which is not an actual edge of the mug, since the mug is cylindrical), and/or (c) color edge vectors, such as edges that are based on the colors of the object (e.g., where one color stops and another color begins, such as for a striped object). In some embodiments, the techniques can be performed using multiple fields, as discussed further herein. In some embodiments, the machine vision system can determine the vector field based on received image data (e.g., 2D and/or 3D image data).

Referring to step 404, the machine vision system can determine a set of regions in the image data. For example, the regions can each include a same number of data entries from the image data, as discussed further below in conjunction with FIGS. 5-8. For example, for 2D data, each region can include 16×16 data entries, 16×8 data entries, 8×8 data entries, 4×4 data entries, 4×3 data entries, and/or the like. As another example, for 3D data, each region can include 16×16×16 data entries, 8×8×8 data entries, 16×8×8 data entries, 5×5×5 data entries, and/or the like.

In some embodiments, the regions overlap among other nearby regions. For example, as discussed further below in FIGS. 5-8, the machine vision system can iteratively move from data entry to data entry, and determine the region based on neighboring data entries (e.g., a pre-determined number of data entries at neighboring locations), such that there is some overlap among data entries for nearby regions. For example, as discussed further in conjunction with FIGS. 7-8, if the region is a 2×2×2 region of data entries in 3D data, a first region may overlap it's neighboring region by four data units.

In some embodiments, configuring the machine vision system to determine the regions with some overlap among neighboring regions can provide for better pose testing. For example, having some overlap can provide for better pose testing compared to using non-overlapping regions. As an illustrative example, assume the machine vision system is using a model with a plurality of probes, and that the probes can have different phases relative to each other. Also assume for this example that the probes have integer spacing in terms of the data units and/or regions, e.g., such that a probe will land within a particular data unit instead of potentially landing at a location shared by a plurality of data units. In such an example, if the machine vision system determined the regions in a non-overlapping manner (e.g., such that the regions do not share data entries with neighboring regions), then the processed image data would reduce the resolution of the original image data, and therefore the location of a probe in the original image data may not be able to be tested in the processed image data. For a simple illustrative example, assume that two neighboring probes of the model fall in side-by-side data entries of the original image data, and the machine vision system determines the processed image data using 2×2 data entry regions. In this example, one of the two probes would fall right on the line between the two regions in the processed image data at each tested pose (e.g., since the resolution of the image data is reduced when computing the processed image data). Therefore, in this example, the machine vision system would not be able to test the probe against a maximum possible score within its 2×2 neighborhood in the processed image data. Since the machine vision system is unable to test that probe in the processed image data, the machine vision system cannot properly estimate the score for the model, e.g., determined using the maximum possible score, as discussed herein. This, therefore, can cause the machine vision system to incorrectly ignore poses for further testing and/or to include poses for further testing that may not include potential locations of the pose.

Computing the regions to have some overlap can allow the machine vision system to test each pose. For example, by computing a max operation at each data entry (e.g., as described in conjunction with FIGS. 5-8), which does not reduce the resolution, then each possible probe of the machine visions system can have a direct hit on a computed value of the processed image data (e.g., and thus the machine vision system can test against the correct 2×2 region of the original image data). The machine vision system can then advantageously shift the model over by more than one cell (e.g., over two cells) for the next test. The model can be shifted in this manner because, due to the construction of the regions and maximum score techniques as discussed herein, with the one test the machine vision system indirectly evaluated a full 2×2 region in the higher layer of image data, and therefore the next place the machine vision needs to test is the next adjacent (non-overlapping) 2×2 regions of the image data. Thus, the techniques allow an individual probe to skip re-evaluating some of the cells it just (implicitly) evaluated in the prior test, which allows the system to advantageously shift the model by more than one cell.

Referring to step 406, the techniques can be configured to use the image data (e.g., a field of vectors, as discussed above) to create processed image data (e.g., a new field) of the same or similar resolution, but wherein each value of the processed image data represents the maximum possible score of a model probe landing within a group of image data entries that includes the particular data entry. For example, the scoring metric may have a maximum possible score that is achievable for a particular probe and data entry of the image data (e.g., which may be potentially lower, depending on the actual data of the probe). To allow the system to perform a conservative search of model poses in the processed image data, the techniques can determine the maximum possible score for the group of image data entries, assuming a perfect match of the probe to each of the data entries, and take the maximum of those maximum scores as the resulting value for the processed image data. This can allow, for example, a probe to be tested to the resulting value to determine whether the data entries associated with those values could potentially have a sufficient score that makes it worth individually testing the group of individual data entries used to determine the resulting value.

In some embodiments, each probe in the model can be a unit vector, and a particular pose of a model can be scored to the image data using a scoring metric that includes calculating a squared dot product of the probes and corresponding image data, which computes the square of the product of the magnitudes and cosine between them, such that the more aligned the higher the score. When using a squared dot product, if the probe exactly matches, then the score would be the square of the length of that data entry (e.g., vector). So on a per-data entry basis, the maximum score reflects the square of the length, which is the maximum possible score that any unit length probe could achieve. In such an example, then each value of the processed image data is populated with the maximum of the squared magnitude of any data entry (e.g., vector) found in the region of data entries in the input image data. Thus, the techniques can summarize individual data entries in the image data (or smaller regions) with a maximum score for an entire region.

Referring to step 408, the processed image data can be tested as if it were a type of image data used to test models (e.g., derived vector fields, such as 2D gradient fields and/or the above-explained normal, edge, and color fields in 3D). For example, once the processed image data is determined, the model can be tested for a particular pose by testing the model's probes to determine the score (e.g., summing magnitudes). When the probe is tested for a particular region, if a probe lands anywhere in the region, the techniques allow the system to determine that the model will not score higher than the value in that region, since it is the maximum in the whole region as discussed above. Therefore, since the score can't be any higher for each data entry associated with the region, the associated value of the region is an upper-bound in the region.

Referring to steps 410-414, the poses tested can be sparser, while providing a guarantee that the computed score cannot be less than the actual score of the best pose within a range of the tested pose. For example, and as discussed further below, if a region is configured to be an 8×8 set of data entries of 2D image data, then if a model's pose does not meet the threshold for a particular value of the region, the system can skip testing any of the remaining values of that region at the next level, as discussed further below in conjunction with FIG. 6. Therefore, if the system tests a set of probes for a model and calculates a score that does not meet the threshold, then the system can eliminate all of the values associated with the tested regions from further testing. If a pose is above the threshold, the system can make a note to look at those associated data entries later for further refinement. The further refinement can include, for example, including performing the method 400 with a smaller region size and/or a refined search as discussed herein.

Referring to step 418, the output of the method 400 is a set of poses of the model that could score above a given threshold. The range of poses that could not score above the threshold do not need to be considered again. In some embodiments, as noted above, the method 400 can be applied in a pyramid-style scheme, where the output of each stage is the input to the next, higher resolution, phase. For example, a first phase can use a certain size region (e.g., sixteen data entries, eight data entries, etc.) a second phase can use a smaller size region (e.g., twelve data entries, ten data entries, four data entries, etc.), and so on. The method 400 allows the machine visions system to perform higher-layer searches in the processed image data, which can allow the machine vision system to take larger steps when testing poses (e.g., to move multiple squares in each dimension, instead of one), and essentially test a plurality of poses at once, as discussed further below.

Figure 5:
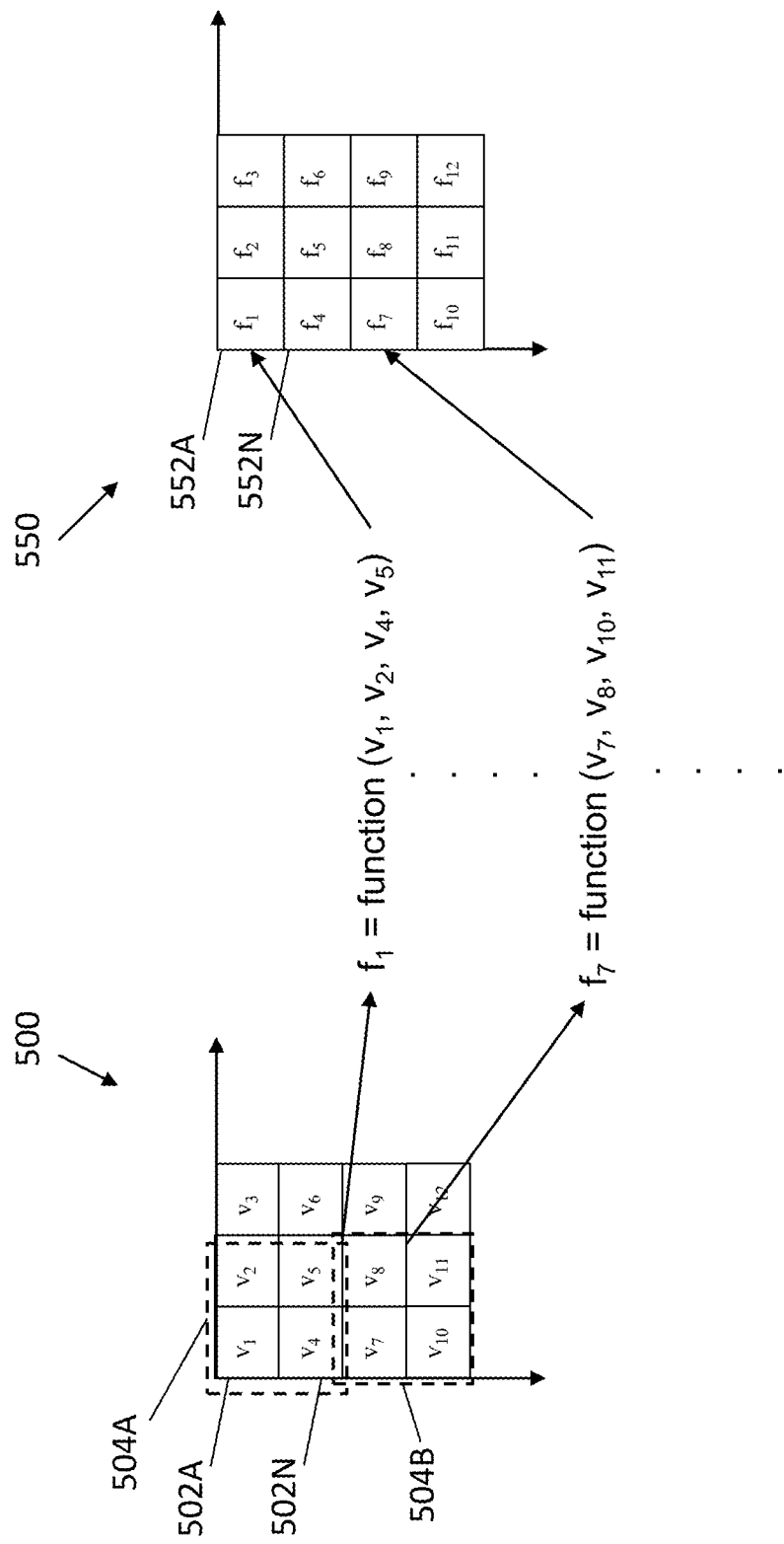
FIG. 5 shows exemplary two-dimensional image data and associated processed image data, according to some embodiments.
Figure 7:
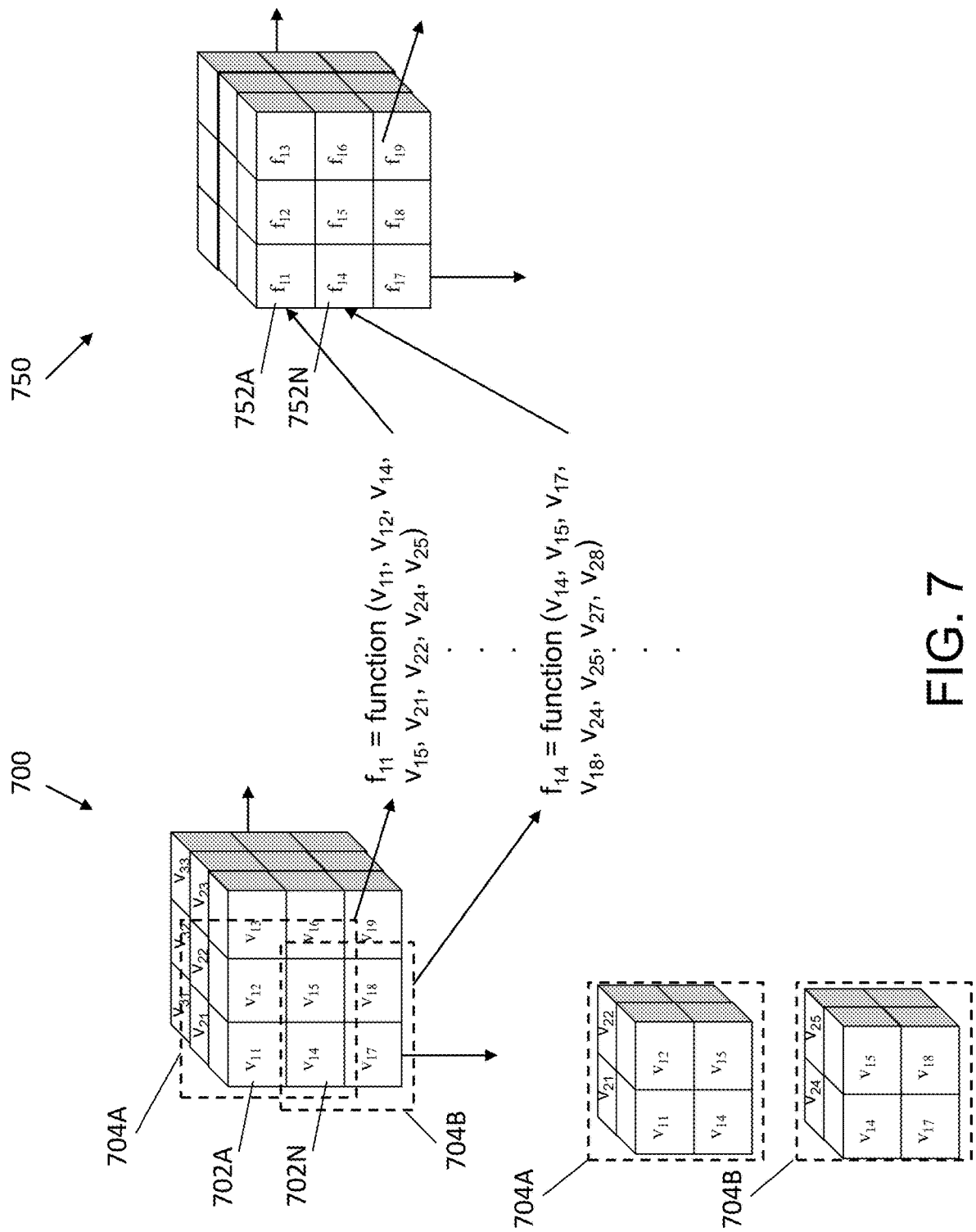
FIG. 7 shows exemplary three-dimensional image data and associated processed image data, according to some embodiments.
Figure 8:
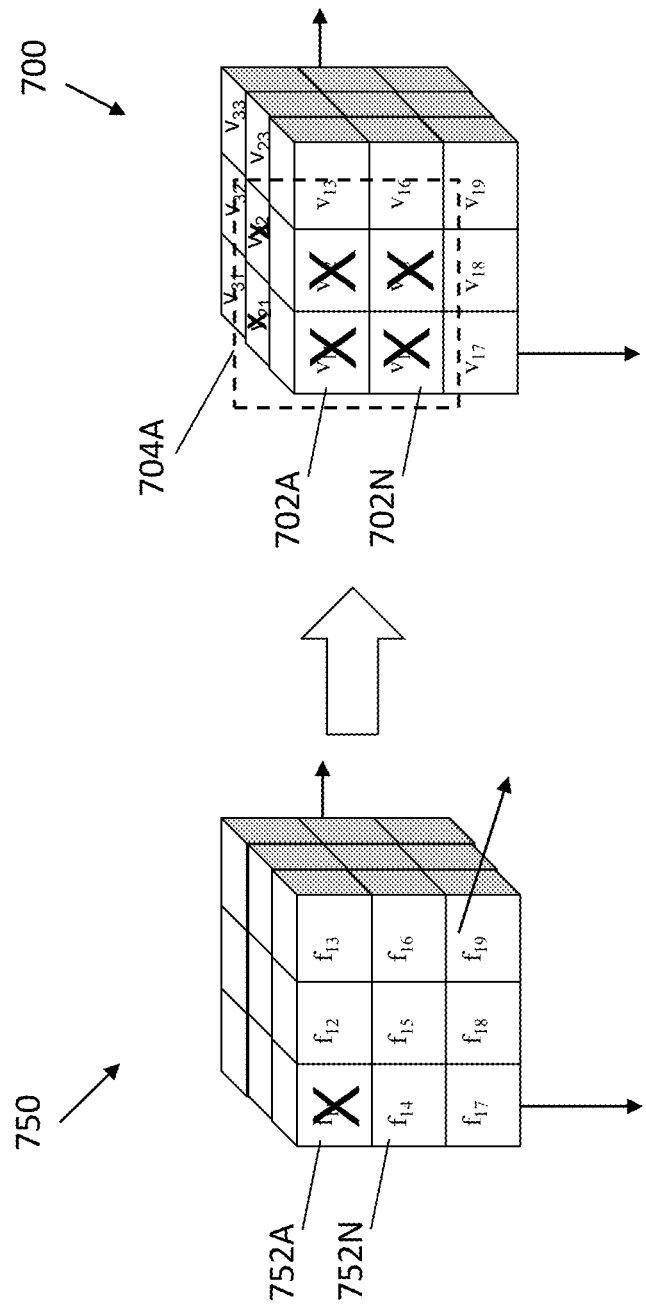
FIG. 8 shows an exemplary elimination of a set of poses and associated data entries of the three-dimensional image data during a coarse search, according to some embodiments.

A machine vision system can run the method 400 to process various types of image data, including 2D and/or 3D data. FIGS. 5-6 provide examples of processing 2D image data, and FIGS. 7-8 provide examples of processing 3D image data. Referring to FIG. 5, FIG. 5 shows exemplary portions of two-dimensional image data 500 and associated processed image data 550, according to some embodiments. The two-dimensional image data 500 includes a set of 2D data entries in this example, 502A through 502N, collectively referred to as data entries 502 (e.g., cells of a lattice). Each data entry 502 has an associated 2D vector, shown with $v_1$, $v_2$, and so on (e.g., data entry 502A has vector $v_1$, and data entry 502N has vector $v_4$, in this example). As shown in FIG. 5, the system is configured to process the 2D image data using regions of four data entries that are in a 2×2 configuration. Two of these regions are illustrated as 504A and 504B. As shown with these exemplary regions, the system can be configured to iteratively step through the 2D image to identify the regions. In this example, as the system moves from each data entry (e.g., iteratively in a left-to-right, top-to-bottom manner), each region includes the current data entry as well as the data entry to the right, the data entry to the bottom, and the data entry between the right data entry and the bottom data entry.

Continuing to refer to FIG. 5, the processed image data 550 includes cells with values 552A through 552N, referred to collectively as values 552. The machine vision system is configured to execute a function that processes the data entries in each region to determine the resulting value for an associated cell in the processed image data. As discussed herein, the function can be a maximum score function that uses the vectors of the associated data entries in the region. For example, the system processes the vectors $v_1$, $v_2$, $v_4$ and $v_5$ of the associated data entries in region 504A using the function to calculate the resulting value $f_1$, which the system uses to determine the value for cell 552A. As another example, the system processes the vectors $v_4$, $v_5$, $v_7$ and $v_8$ of the associated data entries in region 504B using the function to calculate the resulting value $f_7$, which the system uses to determine the value for cell 552B.

FIG. 6 shows an exemplary elimination of a set of poses of the two-dimensional image data during a coarse search, according to some embodiments. FIG. 6 shows the exemplary two-dimensional image data 500 and associated processed image data 550 from FIG. 5. As discussed herein, a score for a model is computed based on a plurality of model probes. For exemplary purposes, FIG. 6 shows that one of the probes for the model, which lands on cell 552A, is determined to have an insufficient score when testing the pose of the model. Since cell 552A is removed from consideration at the layer shown in processed image data 550, moving one layer up to the two-dimensional image data 500, the poses that correspond to the positions of the tested probe are all eliminated from further consideration (e.g., for a refinement search operating on remaining candidate locations in the two-dimensional image data 500).

Therefore, as shown in FIG. 6, when testing at the layer represented by the processed image data 550 (e.g., a layer that summarizes four data entries per each value in the next layer 500), the image processing system can step across the layer and essentially test a group of poses in the next layer 500 when only testing one pose in layer 550. As shown in the examples in FIGS. 5-6, since the system tests the model (with one of the likely many model probes landing at cell 552A as discussed), since $f_1$ represents a maximum for the four data entries in the region 504A (and the same is true for the other probes tested against cells, not shown), the system can determine that since the pose does not score sufficiently, then none of the corresponding poses in the two-dimensional data 500 can score high enough either. Therefore, as shown, higher-layer searches in the processed image data 550 can allow the machine vision system to take larger steps when testing poses (e.g., to move two squares in each dimension, instead of one, when using a 2×2 region as shown in FIG. 5), and essentially test a plurality of poses at once (e.g., four poses at once, when using a 2×2 region).

FIG. 7 shows exemplary three-dimensional image data 700 and associated processed image data 750, according to some embodiments. The 3D image data 700 includes a set of 3D data entries 702A through 702N, collectively referred to as data entries 702 (e.g., a 3D vector field). Each data entry 702 has an associated 3D vector, shown with $v_{11}$, $v_{12}$, and so on. In this example, each vector in the first layer is indicated by $v_{1X}$, where X indicates the particular data entry of the layer (e.g., data entry 702A has vector $v_{11}$, and data entry 702N has vector $v_{14}$, in this example, since both are in the first layer). As shown in FIG. 7, the system is configured to process the 3D image data using regions of eight data entries, which include four data entries from one layer and four data entries from the next layer. Two of these regions are illustrated as 704A and 704B, which each include four data entries from the first layer and the corresponding four data entries in the second layer. As discussed herein, the system can be configured to iteratively step through the 3D image to identify the regions. In this example, as the system moves across each data entry in the 3D image data 700 (e.g., by row, column and depth), the system determines a new region that includes the current data entry as well as the data entry to the right, the data entry to the bottom, the data entry between to the right data entry and the bottom data entry, and the corresponding four data entries at the same location in the next layer.

Continuing to refer to FIG. 7, the processed image data 750 includes cells 752A through 752N with values, referred to collectively as cells 752. The machine vision system is configured to execute a function that processes the data entries in each region to determine the resulting data for an associated value in the processed image data. As discussed herein, the function can be a maximum score function that uses the vectors of the associated data entries in the region. For example, the system processes the vectors $v_{11}$, $v_{12}$, $v_{14}$, $v_{15}$, $v_{21}$, $v_{22}$, $v_{24}$, and $v_{25}$ of the associated data entries in region 704A using the function to calculate the resulting value $f_{11}$, which the system uses to determine the value for cell 752A. As another example, the system processes the vectors $v_{14}$, $v_{15}$, $v_{17}$, $v_{18}$, $v_{24}$, $v_{25}$, $v_{27}$, and $v_{28}$, of the associated data entries in region 704B using the function to calculate the resulting value $f_{12}$, which the system uses to determine the value for cell 552B.

FIG. 8 shows an exemplary elimination of a set of poses of the three-dimensional image data during a coarse search, according to some embodiments. FIG. 8 shows the exemplary three-dimensional image data 700 and associated processed image data 750 from FIG. 7. As discussed herein, a score for a model is computed based on a plurality of model probes. For exemplary purposes, FIG. 8 shows only one of the probes for the model, which lands on cell 752A, for illustrative purposes, although as discussed herein each of the model probes is tested against an associated cell to determine that the pose has an insufficient score. Since cell 752A is removed from consideration at the layer shown in processed image data 750, moving one layer up to the three-dimensional image data 700, the corresponding eight poses in the region 704A are all eliminated from further consideration (e.g., for a refinement search operating on remaining candidate locations in the three-dimensional image data 700).

As shown in FIGS. 7-8, when applying the techniques to 3D image data, the pose space can be quite large due to the number of dimensions. In some three-dimensional images and/or three-dimensional applications, there may only be a small percentage of the space of potential poses out of the large space of potential poses that can contain good candidates (e.g., since the object will only occupy a small portion of the image). As another example, in some three-dimensional images and/or three-dimensional applications, small rotations away from a relevant region can start to get very low scores. The techniques can leverage the higher-layer search (e.g., using processed image data 750 shown in FIG. 7) to quickly eliminate large sets of poses that cannot meet an acceptable score. Higher-layer searches can allow the machine vision system to take larger steps when testing poses (e.g., to move two squares in each dimension, instead of one, when using a 2×2×2 region as shown in FIG. 7), and essentially test a plurality of poses at once (e.g., eight poses at once, when using a 2×2×2 region).

The inventors have determined that using just a single field to perform pattern matching may not provide sufficient information. For example, some techniques use a single field of surface normals to look for probes on the surface of an object, by trying various pose configurations and scoring each pose across the field. However, using just the surface normal field can be problematic when, for example, the scene has one or more large areas with the same surface normal that are similar to the trained object. For example, if a 3D model is trained for a book and the scene includes a table instead of the book, the book will have a lot of matches across the table when using just the surface normal vectors. Therefore, if the normal field is used to perform an initial coarse search for approximate locations of the model, there may be insufficient information in the field to eliminate initial poses from consideration for further refinement. The inventors have developed technological improvements to machine vision search techniques that use additional information beyond just a single field. As discussed further herein, the techniques can include using additional information, such as information regarding crease edges, occlusion boundaries, color, intensity, and/or the like. The additional information can be stored in one or more separate fields for the search process (e.g., so that normal data of a probe can be matched to a normal field, and edge data of a probe can be matched to an edge field). The machine vision system can test each type of data, and use the plurality of tests to determine the ultimate score for a particular pose (e.g., by summing the individual scores, etc.). By using a plurality of fields, additional information on the object can be used to increase the effectiveness of the search process. For example, by searching for both normal and edge information, the techniques can eliminate poses that have a strong score with the normal field but a weak score with the edge field. As another example, the techniques can increase a system's ability to search for certain types of objects, such as uniform objects. For example, while it may be difficult to search for the particular pose of a can, the techniques can include further information of the can, such as color and/or reflectance to improve the search (e.g., since the shape of the can alone may not be sufficient).

Figure 9:
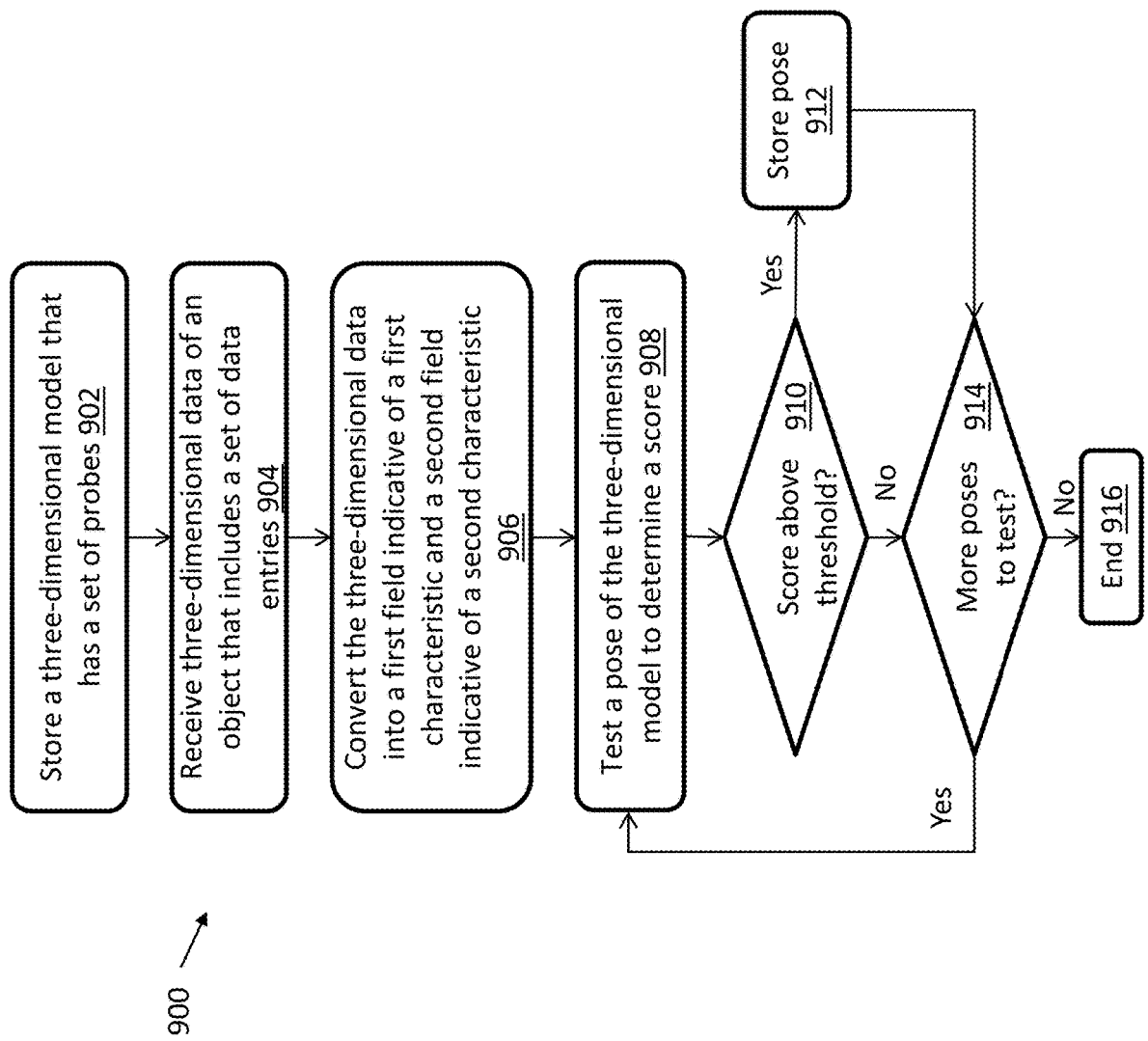
FIG. 9 shows an exemplary method for an initial pose search, according to some embodiments.

FIG. 9 shows an exemplary method 900 for performing an initial search for a pose of a three-dimensional model, according to some embodiments. At step 902, the machine vision system stores a three-dimensional model that includes a set of probes. At step 904, the system receives 3D data (e.g., a point cloud, a depth image, etc.) of an object that includes a set of 3D data entries. At step 906, the system converts the three-dimensional data into a set of two or more fields. A first field includes a first set of values that are each indicative of a first characteristic of an associated data entry or a plurality of data entries from the 3D data entries. A second field includes a second set of values that are each indicative of a second characteristic of an associated data entry or a plurality of data entries from the 3D data entries. At step 908, the system tests a pose of the 3D model with the set of fields, including testing the set of probes to the set of fields, to determine a score for the pose. At step 910 the system determines whether the score meets a predetermined threshold. If the score meets the threshold, the method proceeds to step 912 and stores the pose (e.g., for subsequent refinement). If the score does not meet the threshold, the method proceeds to step 914 and determines whether there are further poses to test, and if so, the method proceeds back to step 908, otherwise the method ends at step 916.

Referring to step 902, the model can be a trained model, as discussed herein. Each of the probes can include one or more vectors. For example, a probe can represent a located vector (e.g., an (x, y, z) location and an (x, y, z) direction). The probes may represent, for example, normal data, edge data, intensity data, intensity gradient data, and/or other information. The normal data can include, for example, a point on a surface and its normal direction (e.g., normal probes). The edge data can include, for example, data for a point on a fold of an object or on a crease edge of an object and a direction along the fold or crease (e.g., an edge probe). The intensity data can include, for example, information associated with intensity, surface reflectivity, color, albedo, and/or the like. For example, the intensity data can reflect information associated with gray scale images and/or color images (e.g., coloring on an object, labels, and/or the like).

Referring to step 906, the first characteristic is different than the second characteristic. Therefore, step 906 generates at least two different fields for the 3D data. Similar to the model probes, the values in the fields can include various types of data, such as surface normal data (e.g., normal vectors that are orthogonal to the surface of an object), edge boundary data (e.g., edge vectors that point across an edge, crease, and/or other feature in the image), intensity data, intensity gradient data, and/or the like.

In some embodiments, the techniques include converting the run-time 3D data into one or more dense 3D arrays, referred to as fields. In some embodiments, the system generates a 3D array for each field. The 3D array is indexed using three indexes, one index for each dimension. The system can be configured to use the indexes of the 3D array to imply the x, y, and z location of each value in the array. For example, the x, y, and z index into the array can be the x, y, z location and/or be transformed into the x, y, z location using a transform. Each value can include, for example, a vector of the same dimension (e.g., which may be 1 or more). Each such vector can be representative of the points in or near an associated 3D data entry or entries. A vector may have a zero (0) length, such as when there are no points found in or near the associated 3D data entry (e.g., when the data entry is within an interior of an object in a 3D point cloud).

Referring to step 908, as discussed herein, testing the pose can include transforming the trained probes according to each hypothesized pose. In some embodiments, to determine the score for the pose, the system can compute the sum of the dot product of each probe and associated value(s) in the field. The probes are tested against the set of fields generated by the system. The system can be configured to compute a similarity metric based on the scores of the probes to the individual fields. For example, the system can be configured to average the individual scores for each field to determine an overall score for the pose. As another example, the system can be configured to perform a more complex operation to combine the separate scores for each field, such as a linear weighting (e.g., a * score 1+b * score 2, etc.), a non-linear weighting (e.g., minimum (score 1, score 2)), and/or the like.

The techniques can store the poses above the threshold for subsequent refinement. In some embodiments, the threshold is configured so that a score above the threshold represents a local peak of the associated scores in the score space (e.g., in the pose space). For example, in some embodiments, in addition to checking whether a particular pose meets the threshold, the system can analyze the score of the particular pose in relation to the scores of neighboring poses. The system can be configured to store a subset of poses, where the subset score higher than their neighbors in the pose space.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

The invention claimed is:

1. A computerized method for testing a pose of a three-dimensional model to three-dimensional data, the method comprising:
    storing a three-dimensional model, the three-dimensional model comprising a set of probes, each probe including data for an associated portion of the three-dimensional model;
    receiving three-dimensional data of an object, the three-dimensional data comprising a set of data entries;
    converting the three-dimensional data into a set of fields, comprising:
        generating a first field comprising a first set of values, wherein each value of the first set of values is indicative of a first characteristic of an associated one or more data entries from the set of data entries; and
        generating a second field comprising a second set of values, wherein each value of the second set of values is indicative of a second characteristic of an associated one or more data entries from the set of data entries, wherein the second characteristic is different than the first characteristic; and
    testing a pose of the three-dimensional model with the set of fields, comprising testing the set of probes to the set of fields, to determine a score for the pose, wherein testing the set of probes to the set of fields comprises:
        determining a first score for the set of probes being tested against the first set of values of the first field;
        determining a second score for the set of probes being tested against the second set of values of the second field; and
        determining the score for the pose based on the first score and the second score.

2. The method of claim 1, wherein generating the first field and/or the second field comprises generating a three-dimensional array for each field, wherein:
    each three-dimensional array comprises a set of three indexes, comprising an index for each dimension; and
    each three-dimensional array implies x, y, and z locations of each associated value of the first set of values and/or the second set of values by the set of three indexes.

3. The method of claim 1, wherein the set of probes, the first set of values of the first field, and the second set of values of the second field comprise surface normal data, edge boundary data, and/or intensity data.

4. The method of claim 1, wherein testing the pose to determine the score for the pose comprises summing a dot product for each probe of the set of probes and associated value of the first set of values and/or the second set of values.

5. The method of claim 1, further comprising:
    testing a plurality of poses to determine a plurality of associated scores;
    determining one or more poses of the plurality of poses comprising a score above a predetermined threshold to generate a set of poses; and
    storing, for subsequent processing, the set of poses.

6. The method of claim 5, wherein each pose in the set of poses represents a local peak of the plurality of associated scores, the method further comprising refining the set of poses to determine a top pose of the three-dimensional model.

7. A system for testing a pose of a three-dimensional model to three-dimensional data, the system comprising one or more processors configured to:
    store a three-dimensional model, the three-dimensional model comprising a set of probes, each probe including data for an associated portion of the three-dimensional model;
    receive three-dimensional data of an object, the three-dimensional data comprising a set of data entries;
    convert the three-dimensional data into a set of fields, comprising:
        generating a first field comprising a first set of values, wherein each value of the first set of values is indicative of a first characteristic of an associated one or more data entries from the set of data entries; and generating a second field comprising a second set of values, wherein each value of the second set of values is indicative of a second characteristic of an associated one or more data entries from the set of data entries, wherein the second characteristic is different than the first characteristic; and test a pose of the three-dimensional model with the set of fields, comprising testing the set of probes to the set of fields, to determine a score for the pose, wherein testing the set of probes to the set of fields comprises:

determining a first score for the set of probes being tested against the first set of values of the first field;

determining a second score for the set of probes being tested against the second set of values of the second field; and determining the score for the pose based on the first score and the second score.

8. The system of claim 7, wherein generating the first field and/or the second field comprises generating a three-dimensional array for each field, wherein:

each three-dimensional array comprises a set of three indexes, comprising an index for each dimension; and each three-dimensional array implies x, y, and z locations of each associated value of the first set of values and/or the second set of values by the set of three indexes.

9. The system of claim 7, wherein the set of probes, the first set of values of the first field, and the second set of values of the second field comprise surface normal data, edge boundary data, and/or intensity data.

10. The system of claim 7, wherein testing the pose to determine the score for the pose comprises summing a dot product for each probe of the set of probes and associated value of the first set of values and/or the second set of values.

11. The system of claim 7, wherein the one or more processors are further configured to:

test a plurality of poses to determine a plurality of associated scores;

determine one or more poses of the plurality of poses comprising a score above a predetermined threshold to generate a set of poses; and store, for subsequent processing, the set of poses.

12. The system of claim 11, wherein each pose in the set of poses represents a local peak of the plurality of associated scores, the one or more processors further configured to refine the set of poses to determine a top pose of the three-dimensional model.

13. At least one non-transitory computer-readable storage medium storing processor-executable instructions that, when executed by at least one computer hardware processor, cause the at least one computer hardware processor to perform the acts of:

storing a three-dimensional model, the three-dimensional model comprising a set of probes each probe including data for an associated portion of the three-dimensional model;

receiving three-dimensional data of an object, the three-dimensional data comprising a set of data entries;

converting the three-dimensional data into a set of fields, comprising:

generating a first field comprising a first set of values, wherein each value of the first set of values is indicative of a first characteristic of an associated one or more data entries from the set of data entries; and generating a second field comprising a second set of values, wherein each value of the second set of values is indicative of a second characteristic of an associated one or more data entries from the set of data entries, wherein the second characteristic is different than the first characteristic; and testing a pose of the three-dimensional model with the set of fields, comprising testing the set of probes to the set of fields, to determine a score for the pose, wherein testing the set of probes to the set of fields comprises:

determining a first score for the set of probes being tested against the first set of values of the first field;

determining a second score for the set of probes being tested against the second set of values of the second field; and determining the score for the pose based on the first score and the second score.

14. The non-transitory computer-readable storage medium of claim 13, wherein generating the first field and/or the second field comprises generating a three-dimensional array for each field, wherein:

each three-dimensional array comprises a set of three indexes, comprising an index for each dimension; and each three-dimensional array implies x, y, and z locations of each associated value of the first set of values and/or the second set of values by the set of three indexes.

15. The non-transitory computer-readable storage medium of claim 13, wherein the set of probes, the first set of values of the first field, and the second set of values of the second field comprise surface normal data, edge boundary data, and/or intensity data.

16. The non-transitory computer-readable storage medium of claim 13, wherein testing the pose to determine the score for the pose comprises summing a dot product for each probe of the set of probes and associated value of the first set of values and/or the second set of values.

17. The non-transitory computer-readable storage medium of claim 13, wherein the instructions are further operable to cause the at least one computer hardware processor to:

test a plurality of poses to determine a plurality of associated scores;

determine one or more poses of the plurality of poses comprising a score above a predetermined threshold to generate a set of poses; and store, for subsequent processing, the set of poses.

18. The non-transitory computer-readable storage medium of claim 17, wherein each pose in the set of poses represents a local peak of the plurality of associated scores, the instructions further operable to cause the at least one computer hardware processor to refine the set of poses to determine a top pose of the three-dimensional model.

* * * * *